US007082321B2

(12) United States Patent
Kuwahara et al.

(10) Patent No.: US 7,082,321 B2
(45) Date of Patent: Jul. 25, 2006

(54) RADIO COMMUNICATION SYSTEM USING ADAPTIVE ARRAY ANTENNA

(75) Inventors: Mikio Kuwahara, Kokubunji (JP); Nobukazu Doi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 414 days.

(21) Appl. No.: 10/618,757

(22) Filed: Jul. 15, 2003

(65) Prior Publication Data

US 2004/0014501 A1   Jan. 22, 2004

Related U.S. Application Data

(63) Continuation of application No. 09/364,269, filed on Jul. 30, 1999, now Pat. No. 6,597,678.

(30) Foreign Application Priority Data

Feb. 1, 1999   (JP) ................... 11-023469

(51) Int. Cl.
*H04B 1/38* (2006.01)

(52) U.S. Cl. ............... 455/562.1; 455/561; 455/101; 375/299; 375/347

(58) Field of Classification Search ............ 455/562.1, 455/277.1, 277.2, 278.1, 279.1, 69, 522, 455/561, 550.1, 575.1, 424, 425, 456.5, 456.6, 455/67.11, 67.13, 68, 422.1, 436, 439, 453, 455/455, 456.3, 13.4, 25, 19, 63.4, 126, 275, 455/273, 101, 575.7, 501, 506; 370/342, 370/335, 320, 441, 310.2, 329, 311, 278, 370/332, 470, 333, 331, 465, 474, 479, 328, 370/340, 334; 342/380, 383, 368, 379; 375/267, 375/347, 220, 141, 261, 298, 300

See application file for complete search history.

(56) References Cited

U.S. PATENT DOCUMENTS

| 6,049,307 | A | * | 4/2000 | Lim ........................... 342/383 |
| 6,108,565 | A | * | 8/2000 | Scherzer .................. 455/562.1 |
| 6,118,987 | A | | 9/2000 | Hiramatsu et al. |
| 6,311,075 | B1 | * | 10/2001 | Bevan et al. ............ 455/562.1 |
| 6,463,295 | B1 | * | 10/2002 | Yun ........................... 455/522 |
| 6,697,343 | B1 | * | 2/2004 | Kamel et al. ............... 370/311 |
| 2002/0122465 | A1 | * | 9/2002 | Agee et al. ................. 375/141 |

FOREIGN PATENT DOCUMENTS

| JP | 10-285092 | 10/1998 |
| WO | WO97/27643 | 7/1997 |

OTHER PUBLICATIONS

T. Matsumoto et al. "A Technical Survey and Future Prospects of Adaptive Array Antennas in Mobile Communications", NTT DoCoMo Technical Journal, vol. 5, No. 4, pp. 25-36 (Jun. 1998).

* cited by examiner

*Primary Examiner*—Edward F. Urban
*Assistant Examiner*—Charles Chow
(74) *Attorney, Agent, or Firm*—Antonelli, Terry, Stout and Kraus, LLP.

(57) ABSTRACT

A radio communication system and method having an array antenna and a weighting arrangement that provides a downlink array weight for a downlink on the basis of information about bearings of a plurality of incoming signals received through a plurality of uplinks, and transmission power control information about transmission data to be transmitted through a downlink.

4 Claims, 4 Drawing Sheets

RADIO COMMUNICATION SYSTEM USING ADAPTIVE ARRAY ANTENNA

CROSS-REFERENCE TO RELATED APPLICATION

This application is a continuation of U.S. application Ser. No. 09/364,269, filed Jul. 30, 1999 now U.S. Pat. No. 6,597,678, the parent application being incorporated by reference herein.

BACKGROUND OF THE INVENTION

The present invention relates to a base station using an adaptive array antenna and included in a radio communication system represented by a cellular radio communication system. The present invention is effective particularly in application to a system employing a code-division multiple access system (CDMA system) and controlling transmitting power for a downlink.

An adaptive array antenna (hereinafter abbreviated to "AAA") has attracted a great deal of attention in recent years as mentioned in NTT DoCoMo Technical Journal, Vol. 5, No. 4, pp. 25–36 (June 1998). When applying an AAA to radio communication represented by cellular communication, the AAA is installed, in most cases, at a base station because the AAA has large construction.

There have been made many studies of the AAA relating to uplinks. Since the AAA forms an appropriate beam and does not radiate radio waves in undesired directions, it is expected that the capacity of downlinks can greatly be increased by using the AAA. In a time-division duplex system (hereinafter referred to as "TDD system"), an uplink and a downlink are used for the same frequency in a dime-division mode. Therefore, the timing of a pair of uplink and downlink is sufficiently small as compared with a fading frequency, the used propagation paths can be regarded as the same paths and transmission can be achieved by using the weight of the same array antenna as that for the uplink.

In a frequency-division duplex system (hereinafter referred to as "FDD system"), an uplink and a downlink use propagation paths of different frequencies. Therefore, array spaces for the uplink and the downlink differ from each other, so it is necessary that control is executed on the basis of a feedback signal from a terminal station or a propagation path for the downlink is predicted. Although the propagation paths change slightly between the uplink and the downlink, the bearing of a path connecting the base station and the terminal station changes scarcely because the bearing of the terminal station does not change. A method of estimating an array weight from bearing estimation by using such a property is proposed.

SUMMARY OF THE INVENTION

A third generation communication system represented by a W-CDMA system is expected to carry out unbalanced one-way communication and packet communication in addition to conventional sound connection. In this system also, the AAA is regarded as an attractive, important means for increasing capacity. However, when the uplink and the downlink differing from each other in information transmission rate have different values of transmission power, directions in which null is to be made are generally different. Therefore, a weight which is effective for the uplink is no longer a suitable weight for the downlink. Weights respectively for the uplink and the downlink must individually be estimated, and array weights conforming to the densities of transmitted information must be estimated.

Accordingly, it is an object of the present invention to reduce base station transmission power and to increase the number of simultaneously connected terminal stations when an AAA is applied to the CDMA system to improve the downlink as well as the uplink.

The object is achieved by a cellular radio communication base station of a code-division multiple access system (CDMA system) comprising: a plurality of antennas distributed over a spatial domain; a despreading means which prepares, when a specific mobile station B is noticed, a despreading code sequence in complex conjugate relation with a spread code sequence used by the mobile station B for transmission, multiplies signals received by the antennas by the despreading code sequence at an appropriate phase difference corresponding to a propagation delay of a signal from the mobile station B to the base station, and calculates the sum total; a spatial correlation matrix estimating means that calculates the correlation between the outputs of the plurality of antennas at a code phase corresponding to a specific propagation path for a code sequence corresponding to the specific mobile station in the despreading means and stores the calculated data about the correlation; a downlink modulation means that modulates information transmitted from the base station through the downlink to the mobile station; a downlink transmission output control means that determines a transmission output for the downlink; a downlink transmission power weighting means that adjusts the output of the downlink modulating means according to an instruction given by the downlink transmission output control means; a downlink beam forming means that weights the output of the downlink modulating means so that signals of an appropriate complex envelope are radiated through the plurality of antennas; and a downlink array weight control means that calculates subspaces for mobile stations and paths on the basis of the output of the spatial correlation matrix estimating means, normalizes the subspaces by a maximum diagonal factor among those of the subspaces for all the downlinks excluding the mobile station B, weights normalized values by the downlink transmission output provided by the downlink transmission output control means, adds up the weighted normalized values to determine a subspace for an interference signal, and determines a weight of the downlink beam forming means for the mobile station B on the basis of an array response vector obtained from a correlation matrix relating to the mobile station B, and the interference subspace.

Moreover, in the cellular radio communication base station, the downlink transmission output control means determines transmission power on the basis of a power control signal provided by a mobile station or downlink signal information available from the base station.

These and other objects and many of the attendant advantages of the invention will be readily appreciated as the same becomes better understood by reference to the following detailed description when considered in connection with the accompanying drawings.

DETAILED DESCRIPTION OF THE PREFERRED EMBODIMENTS

A third-generation radio communication system uses a code-division multiple access system (CDMA system) to support communication at various line speeds. An AAA form a beam directed toward a desired mobile station in a optional direction or a beam having null in a direction of an optional interference source to increase the capacity of the system. Generally, communication of the CDMA system having a high transmission rate needs transmission power higher than that needed by communication of the CDMA system having a low transmission rate. Therefore, the AAA forms an antenna pattern having null in a direction of a high-transmission-rate mobile station for mobile stations excluding high-transmission-rate mobile stations to increase the number of mobile stations when can be connected simultaneously (capacity).

Figure 2:
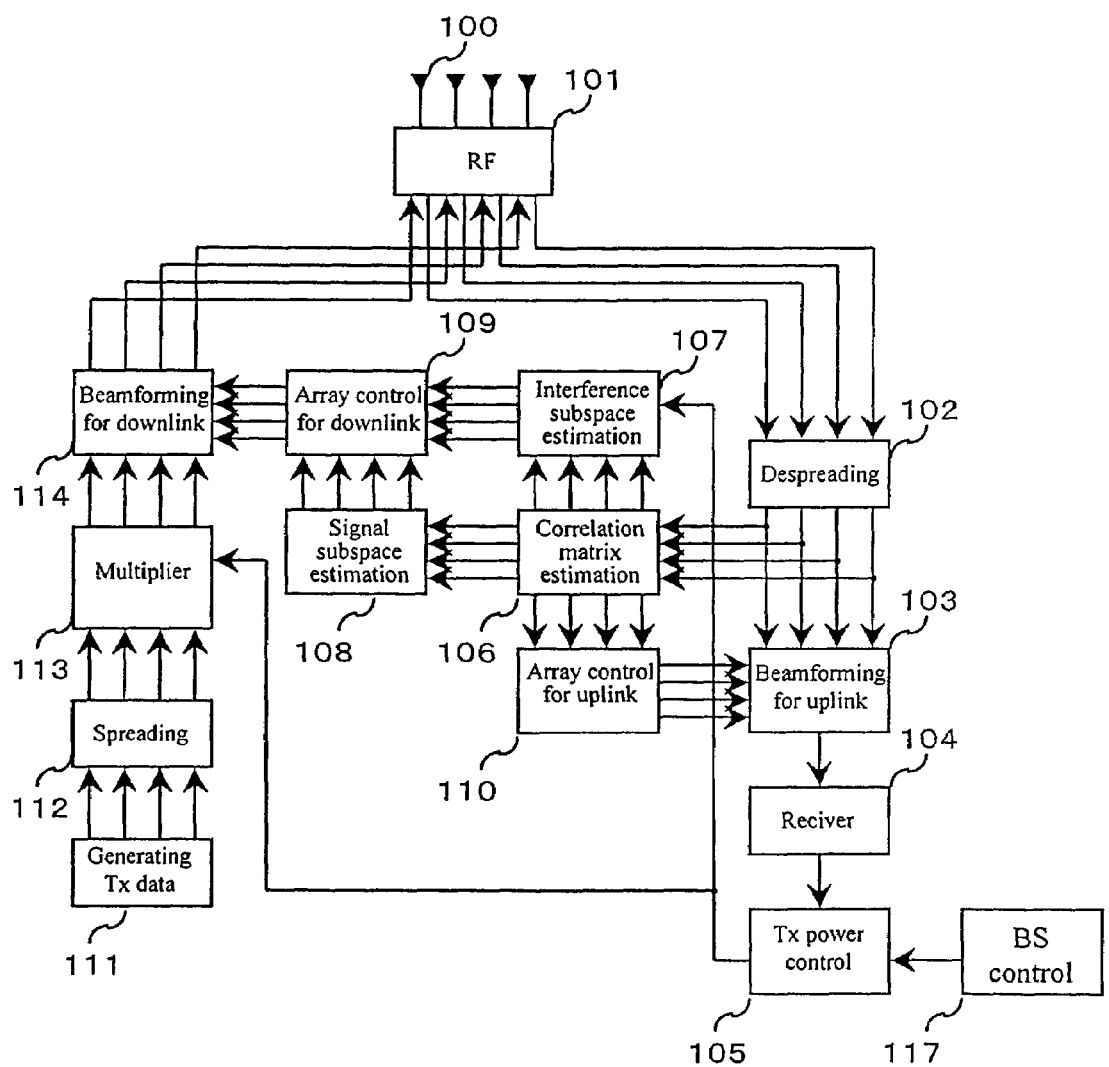
FIG. 2 is a block diagram of a preferred embodiment according to the present invention.

A radio communication base station in a first embodiment of the present invention will be described with reference to FIG. 2 and Expressions (1) to (9) and (12). FIG. 2 shows the configuration of the first embodiment of the present invention, Expression (1) is a correlation matrix, Expression (2) expresses a method of obtaining a desired wave subspace from the correlation matrix, Expression (3) are simultaneous linear equations for calculating an optimum weight on the basis of an interference subspace and an array response vector, Expression (4) is an equation for obtaining an array response vector on the basis of the desired wave subspace, Expression (5) shows that the correlation matrices are Hermitian matrices, Expression (6) expresses frequency conversion, Expression (7) shows a noise subspace, Expression (8) shows an interference subspace, Expression (9) is simultaneous linear equations for calculating an optimum weight on the basis of the interference subspace and the array response vector, and Expression (12) expresses a beam forming operation.

Referring to FIG. 2 showing the radio communication base station in the first embodiment according to the present invention, a base station is provided with a plurality of antennas 100 constituting an AAA. The antennas 100 distributed in a space to form a sensor capable of sensing incoming waves coming from various arrival angles. The operation of the AAA in an uplink, i.e., an link through which signals are transmitted from mobile stations to the base station, will be described.

The weight of the array, i.e., array response vector, is determined on the basis of information collected by sensors (antennas) for the operation of the AAA. Generally, the array response vector is referred to as a-vector, which is a weight for purely receiving a desired wave signal in a maximum. There are many possible method of determining the array response vector. A method which accumulates snapshots of a desired wave signal, determines a correlation matrix between the sensors relating to the desired wave signal, and calculates the weight will be described by way of example.

The CDMA system increases the bandwidth of a signal by multiplying information by a code sequence called a spread code sequence when sending out the information, and returns received information to its original information by multiplying the received signal by a despreading code sequence when receiving information. If the code for despreading the information or the phase of the code does not agree with a received signal, the signal remains in a randomized state. Only a desired wave signal can be extracted by selectivity using the code sequence and the phase. Therefore, the desired wave signal can be reproduced even if a plurality of wave signals are included in a frequency band, provided that the spread code and the phase of the desired wave signal are known.

Referring to FIG. 2, information received by the antennas 100 is down-converted by an RF circuit 101, and a despreading system 102 multiplies the down-converted information by an appropriate code sequence of an appropriate phase. Consequently, the S/N ratio of the information increases. Signals obtained by despreading will be called signals x. Since the information is received by an array antenna, the number of the signals x for one code sequence and a phase for the code sequence is equal to the number of the component antennas 100. Since the intervals between the antennas 100 of the array antenna is far smaller than a distance which can be distinguished by path search by the CDMA system. Therefore, it is considered that signals arrive at the antennas 100 at the same path delay. Suppose that the carrier frequency is 2 GHz and the chip rate of the spreading code is 4.096 MHz. Then, one chip gap corresponds to about 73 cm. Since the performance of the array antenna is dependent on carrier frequency, the chip gap is equal to several times the wavelength of a wave of 2 GHz and is 1 m or below at the greatest. Therefore, a chip gap dependent on the intervals between the antennas is on the order of 1/73=15% or below, which is scarcely significant.

A spatial correlation matrix estimating circuit 106 calculates a spatial correlation matrix R by using Expression (1)

$$R_{c1,p1} = \begin{bmatrix} x_1 x_1^* & \cdots & x_1 x_m^* \\ \vdots & \ddots & \vdots \\ x_m x_1^* & \cdots & x_m x_m^* \end{bmatrix} \quad \text{Expression 1}$$

where $x_i$ (i=1, 2, . . . , m, m is the number of antennas) are despread signals. In the right side of Expression (1), subscript characters attached x are antenna numbers, and asterisks indicate complex conjugate operation. Subscripts attached to R on the left side of Expression (1) indicate that the matrix is a spatial correlation matrix of signals despread by an appropriate phase "p1" of an appropriate code sequence "c1". Since correlation is a statistical value, some snapshots must be collected and the mean of the snapshots must be calculated. More concretely, calculation using Expression (1) is repeated by a number of times corresponding to several tens to several hundreds of symbols and the mean of the calculated data is calculated by a mean calculating operation. The mean calculating operation corresponds to a time-averaging operation.

A series of operations for determining the spatial correlation does not need any information about transmitted signals; that is any known information, such as a pilot signal, is not necessary. Only information about the code sequence used for despreading and about the phase of the code sequence is necessary. The code sequence is known because the same is assigned to the base station. The phase information detects the phase of the path by a path search means.

If the same mobile station sends out pilot signals together with data signals by using another spreading code sequence (for example, W-CDMA system), a spatial correlation matrix of the pilot signals is calculated in addition to the spatial correlation matrix of the data signals, and both the spatial correlation matrices are used for averaging. Samples for averaging can be increased and accuracy in estimating the spatial correlation matrices can be improved by using pilot symbols. If the ratios of signal power density to interference power density for bits are equal, it is possible to consider that weights for averaging are equal.

An uplink array weight estimating circuit 110 executes calculation using Expressions (2) to (4). A spatial correlation matrix R includes signal components, interference components and noise components reduce by averaging. These components are separated by using Expressions (2) to (4) to form a beam having a maximum beam in the direction of signals and null in the direction of an interference wave.

Since the sensors have a finite resolution, extraction of the features of signals and interference waves in the sensor space is necessary. Extracted spatial information will be referred to as a subspace. A despread signal despread by the appropriate phase of the appropriate code sequence used for determining the spatial correlation matrix by the spatial correlation matrix estimating circuit 106 contains a signal of a gain corresponding to the despreading code, an interference component and a noise component. A despread signal despread by an inappropriate code sequence or an inappropriate phase contain all users' signals not having any gain, i.e., an interference component and a noise component. "The inappropriate code sequence" is such a code sequence not used by any one of the mobile stations included in the cell. "The inappropriate phase" is such a code sequence in agreement with a phase not actually including any delayed wave. In the following description, the inappropriate code sequence and the inappropriate phase are designated by cx and px, respectively.

$$R_{dd,c1,p1} = \frac{R_{c1,p1} - R_{cx,px}}{Pg_{c1} - 1} \qquad \text{Expression 2}$$

As is obvious from Expression (2), the subspace of only the desired wave is the difference between a subspace obtained by using the appropriate code sequence and the appropriate phase, and the subspace obtained by using the inappropriate code sequence and the inappropriate phase. In Expression (2), Pg is spread gain, and (Pg−1) is a divisor for normalization. The received signal has a gain substantially proportional to the propagating speed of the received signal. Therefore, uplinks having higher transmission rates have greater determinants for the subspace; that is, have higher influence.

$$(R_{cx,px} - R_{dd,c1,p1}) w_{opt} = a_{c1,p1} \qquad \text{Expression 3}$$

$$a_{c1,p1} = \max_{eigenvalue} \{\text{eigenvector}(R_{dd,c1,p1})\} \qquad \text{Expression 4}$$

An optimum array weight w is determined by using bearing information about the desired wave obtained by using Expression (2), and Expression (3). Array response vector a for the desired wave expressed by Expression (3) is determined by using Expression (4). The array response vector a is a characteristic vector of a maximum characteristic value of a subspace containing only signals.

The parenthesized term of Expression (3) is the remainder of the subtraction of the subspace of the signal from a subspace containing (signal, interference wave and noise) and represents (interference wave+noise) subspace. The solution of Expression (3) is an array weight that makes the SIR (signal interference ratio) for the specific phase (path) of a specific code sequence (user) maximum. Thus an uplink weight is obtained.

An uplink beam forming unit 103 multiplies the despread signal provided by the despreading unit 102 by the uplink array weight to form a beam. More concretely, the uplink beam forming unit 103 executes calculation using Expression (12)

$$y = W^H X = [w_1^* \ \ldots \ w_m^*] \begin{bmatrix} x_1 \\ \vdots \\ x_m \end{bmatrix} \qquad \text{Expression 12}$$

Output y is the product of a transposed conjugate vector and a despread signal x. A signal produced by spatial composition by the beam forming unit 103 is demodulated by a receiver 104.

It is assumed that the radio communication base station shown in FIG. 2 executes transmission power control for the downlink. More concretely, the quality of a base station signal received by a mobile station is measured, and the base station is requested to increase or decrease the transmission power according to the measured quality of the base station signal. The output of the receiver 104 contains a control symbol for transmission power control received from the mobile station. A block deciding weight of transmission power control 105 extracts the control symbol and decides levels of transmission output for the mobile stations (a block multiplying received signals with transmission power control weight 113). The transmission power control information is used also for estimating a weight for the downlink.

The downlink determines an interference subspace according to the transmission power of information. An interference subspace estimating unit 107 estimates the interference subspace of the down link by using Expression (8)

$$R_{nn} = R_{cx,px} - \sum_{ck,pl} R_{dd,cx,pl} \qquad \text{Expression 7}$$

$$R_{l,c1,p1} = \sum_{\substack{ck \\ ck \neq cl}} \lambda_{ck} \frac{R_{dd,ck}}{\max[R_{dd,ck}]} + \beta R_{nn} \qquad \text{Expression 8}$$

$$R_{dd,ck} = \sum_{\substack{pl \\ pl \neq pl}} R_{dd,ck,pl}$$

where, $$R_{l,c1,p1} w_{opt} = a_{c1} \qquad \text{Expression 9}$$

where λ is a value proportional to transmission output decided by the block deciding weight of transmission power control 105. Expression (8) has subspace $R_{nn}$ expressed by Expression (7) to prevent Expression (9) for calculating weight w of the downlink from becoming singular when the number of the mobile stations is small, or when there is an interference station requiring high power and the respective directions of the desired station and an interference station coincide with each other. Generally, the noise subspace is a unit matrix. If a transmission power amplifier or the like has a deviation, the magnitude of a diagonal factor has a deviation. The effect of environmental noise can be estimated by using a value calculated by using Expression (7). However, a unit matrix is employed for simplicity. It is proper to use the absolute value of a maximum element in the result of addition of the first term on the right side of the expression as a coefficient β.

Conditional expression for Expression (8) estimates a signal space subspace for each mobile station. Signals for each path are added to estimate incoming direction taking into consideration the path mean in addition to the simple time mean. (Whereas patterns are formed for all the uplinks, patterns are not formed for all the downlinks and one pattern is formed for the mean of paths.). Expression (8) normalizes the subspaces of the mobile stations obtained by using the conditional expression and adds up the normalized subspaces, because, as mentioned above, signals received through the uplinks also have different transmission rates and different strengths and the effect must be removed. In Expression (8), "max" signifies a maximum diagonal factor.

loop mode to the base station to determine an initial transmission value.

In the interference subspace estimating unit 107, the reduction of the influence of frequency difference between the uplink and the downlink is effective (when the FDD system is employed). Frequency conversion is executed for the subspaces, the results of frequency conversion are weighted and added. A method of frequency conversion will be explained with reference to Expressions (5) and (6).

$$R_{dd,c1,p1} = \begin{bmatrix} X_{11} & \cdots & X_{1m} + jY_{1m} \\ \vdots & \ddots & \vdots \\ X_{1m} - jY_{1m} & \cdots & X_{mm} \end{bmatrix} \quad \text{Expression 5}$$

$$R_{dd,c1,p1} = \begin{bmatrix} X_{11} & \cdots & |X_{1m} + jY_{1m}|\left(\frac{X_{1m} - jY_{1m}}{|X_{1m} - jY_{1m}|}\right)^{f_{down}/f_{up}} \\ \vdots & \ddots & \vdots \\ |X_{1m} - jY_{1m}|\left(\frac{X_{1m} - jY_{1m}}{|X_{1m} - jY_{1m}|}\right)^{f_{down}/f_{up}} & \cdots & X_{mm} \end{bmatrix} \quad \text{Expression 6}$$

According to this method, array patterns formed on the basis of the phase relation between the downlinks differ from each other when the angular differences between the paths increase, do not conform to the actual propagation paths and deterioration occurs. Since the time mean need to remove the influence of fading, satisfactory averaging on the order of several hundreds milliseconds is necessary.

Figure 1:
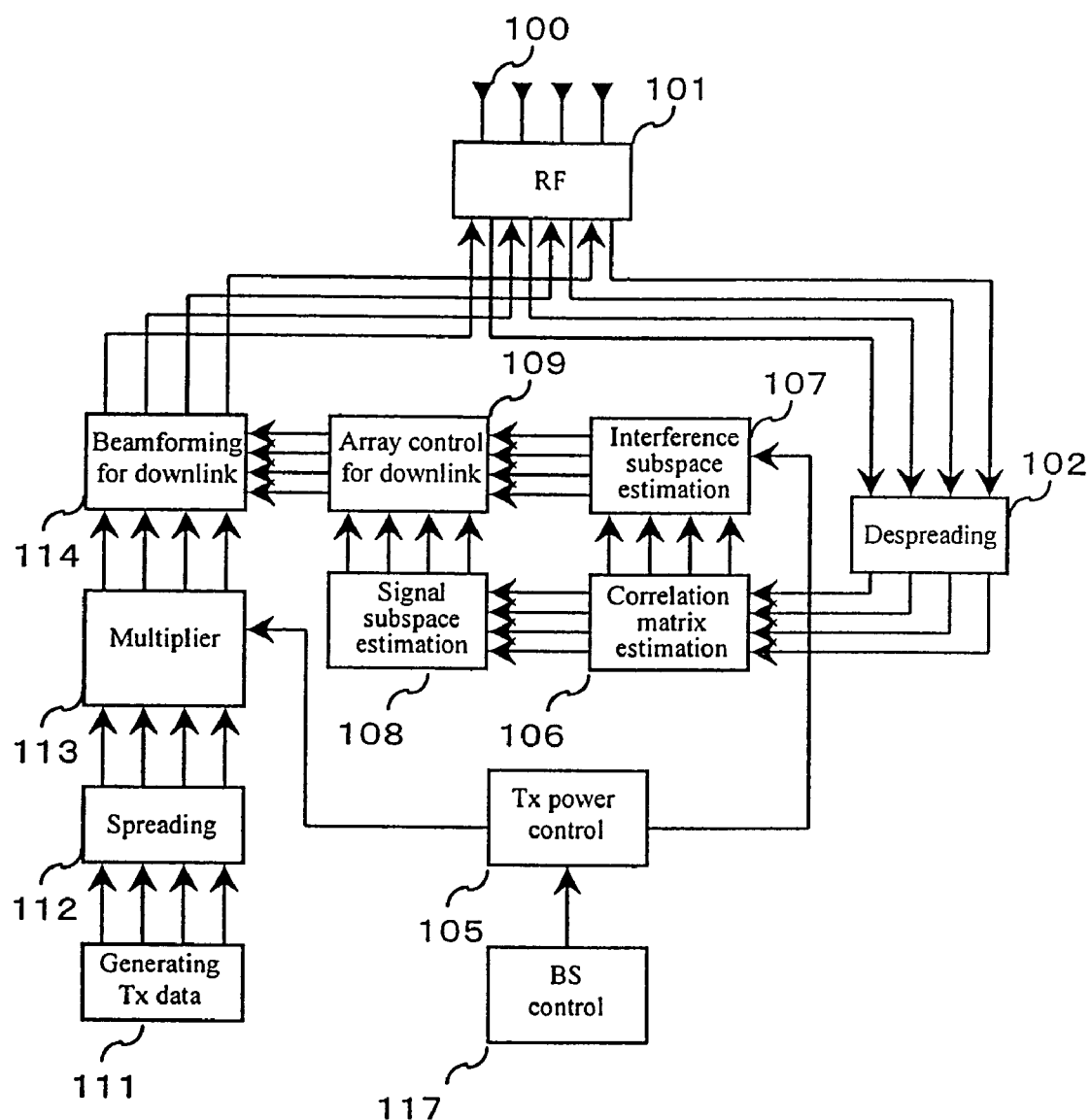
FIG. 1 is a block diagram of a preferred embodiment according to the present invention.

This embodiment has been described in connection with closed-loop power control. The present invention is featured by weighting the interference subspace obtained by the uplink according to the transmission output on the downlink. Therefore, the present invention is applicable not only to a case where transmission power is controlled according to an instruction provided by the mobile station as shown in FIG. 2, but also to all the base stations provided with a general transmission power control means for transmission power control as shown in FIG. 1. This includes also a simple power control system which determines transmission power only on the basis of information about the transmission rate of the downlink. For instance, it sometimes occurs that power control does not converge in an initial stage of establishment of a link between a base station and a mobile station due to its large time constant. When determining an initial transmission value, it is effective to determine its transmission power on the basis of transmission rate to insure satisfactory communication quality. Information about transmission rate is received from a base station control unit and the transmission output of the downlink is determined. In this case, impact at initial connection can be moderated by weighting on the basis of transmission power for each mobile station when estimating an interference subspace. The present invention is effective also for a method which transmits a power control value from the mobile station in an open-loop mode instead of the close- Expression (5) expresses a subspace for each signal. The matrix of Expression (5) is called a Hermitian matrix in which diagonal factors are real values and the rest are complex numbers. An upper triangular matrix and a lower triangular matrix are in a conjugate relation with respect to an axis of diagonal factors. The correlation between the arrays is dependent on the interantenna distance, i.e., the distance between the antennas. Since the interantenna distance acts in an electrical length, values for the uplink and the downlink are slightly different from each other depending on the difference in carrier frequency. In subspaces detected for paths, when propagation path lengths are the same in the accuracy of path detection, it is expected that the angles of incoming radio waves are distributed in a narrow range of several degrees at the widest. Accordingly, frequency conversion can be carried out on an assumption that a single plane wave is received. On this assumption, frequency conversion can be achieved by carrying out rotation correction for each element. When the frequency difference between the uplink and the downlink is as small as several percent and the interantenna distance is not greater than the wavelength. frequency conversion is scarcely effective and may be omitted.

The array response vector of the downlink is estimated by a signal subspace estimating unit 108. An array response vector a is estimated by using a spatial correlation matrix provided by the spatial correlation matrix estimating unit 106 and Expression (4). In Expression (4), it is desirable to use a value obtained by frequency conversion as R. As mentioned above, frequency conversion may be omitted when the frequency difference between the uplink and the downlink is small.

A downlink array weight estimating unit 109 estimates an array weight that makes transmission S/I (signal/interference) ratio maximum on the basis of information received from the interference subspace estimating unit 107 and the signal subspace estimating unit 108. Expression (9) is used for deciding an array weight w.

A transmission data generating unit 111 generates transmission data modulated by a downlink modulating means for the mobile stations. A spreading unit 112 processes the transmission data individually for spreading by using a spreading code of an appropriate sequence. The block multiplying received signals with transmission power control weight 113 converts the output of the spreading unit 112 into a signal of appropriate power. A downlink beam forming unit 114 multiplies the output of the block multiplying received signals with transmission power control weight 113 by an array weight estimated by the downlink array weight estimating unit 109 to generate a signal having an appropriate spatial selectivity. The signals for the mobile stations generated for the antennas. The downlink array weight estimating unit 109 adds signals for antennas and the mobile stations to the signals for the mobile stations and the antennas to give composite signals for the antennas to the RF unit 101. The RF unit 101 up-converts the composite signals to signals of a carrier frequency and transmits the signals through the antennas 100.

Thus, signals can be transmitted also through the downlink by using a beam corresponding to the transmission strength and transmission rate of the signal.

Figure 3:
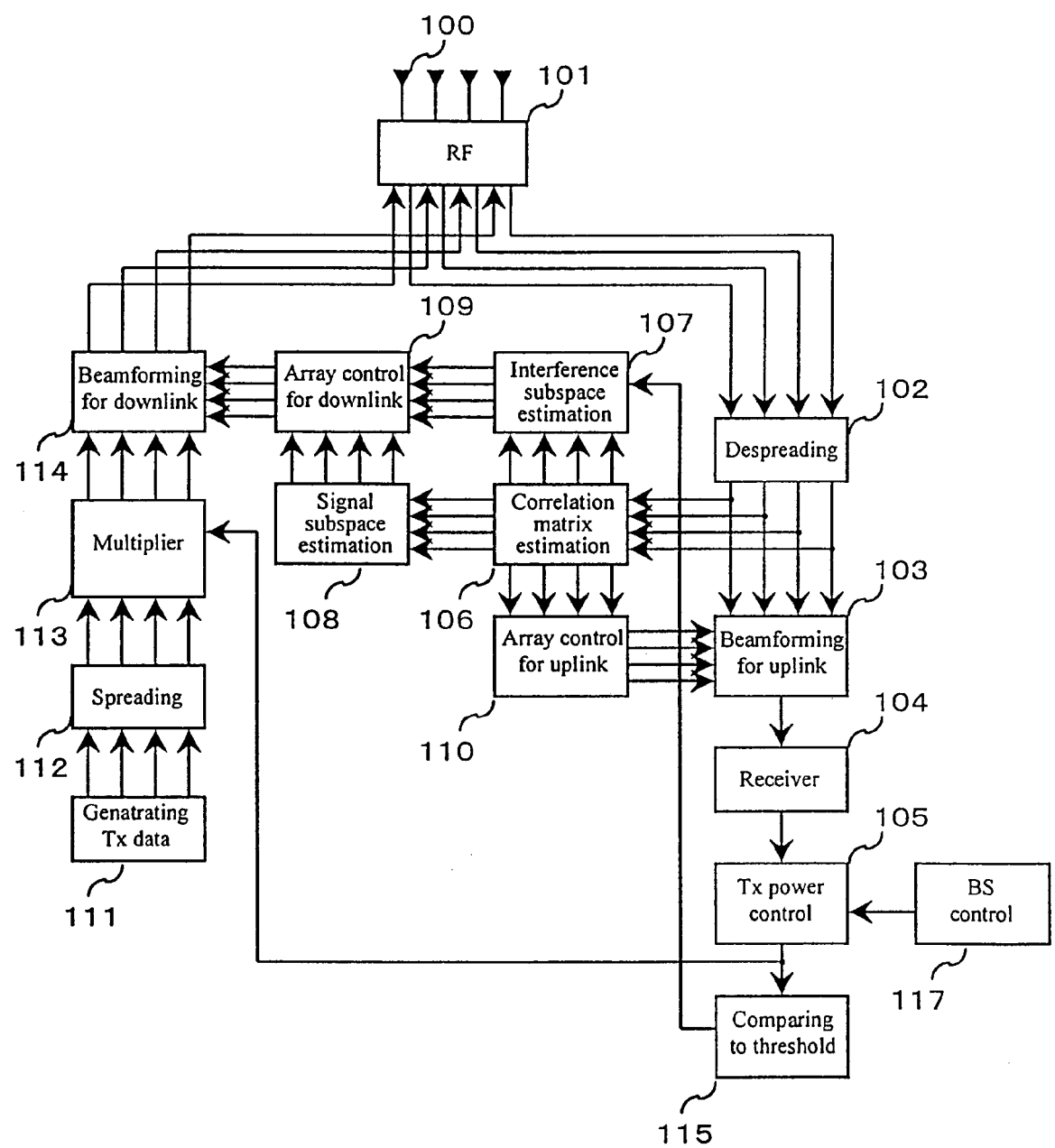
FIG. 3 is a block diagram of a preferred embodiment according to the present invention.

A radio communication system in a second embodiment according to the present invention will be described with reference to FIG. 3 and Expression (10). Expression (10) shows that interference subspace estimation uses a threshold.

$$\lambda_i = \begin{cases} 0 & (\lambda_i < th) \\ \lambda_i & (\lambda_i \geq th) \end{cases} \qquad \text{Expression 10}$$

The radio communication system in the second embodiment differs from the radio communication system shown in FIG. 2 in the additional employment of a threshold comparing unit 115. It is an object of the present invention that uses an interference subspace for the estimation of a downlink array weight to increase the S/I in transmission to a maximum by 0. interference because interference is not spatially white. A system that deals with a plurality of terminals, such as a cellular communication base station, does not have large spatial selectivity due to the effect of averaging based on the law of large numbers. If there is a mobile station having a high transmission rate or if a mobile station is located near the boundary between cells and is subject to the strong power of another cell, the mobile station requires a high transmission power. Consequently, spatial selectivity that increases transmission power for transmission in a specific direction is generated. Therefore, a circuit of a small scale is able to exercise a great effect if an interference subspace is constructed only for the dominant mobile stations.

The threshold comparing unit 115 compares the transmission power of the base station with a threshold, and adds the transmission power to the interference subspace only when the transmission power is greater than the threshold. The relation is expressed by Expression (10). Only signals of transmission power levels higher than the threshold th are used for interference subspace estimation. Although the accuracy of interference subspace is deteriorated by the omission of added subspaces, a sufficient effect for null generation can be obtained with slight deterioration because intense signals determining the feature of interference are taken into consideration. In this embodiment, circuit scale can be reduced thanks to omission of addition number of subspaces.

Figure 4:
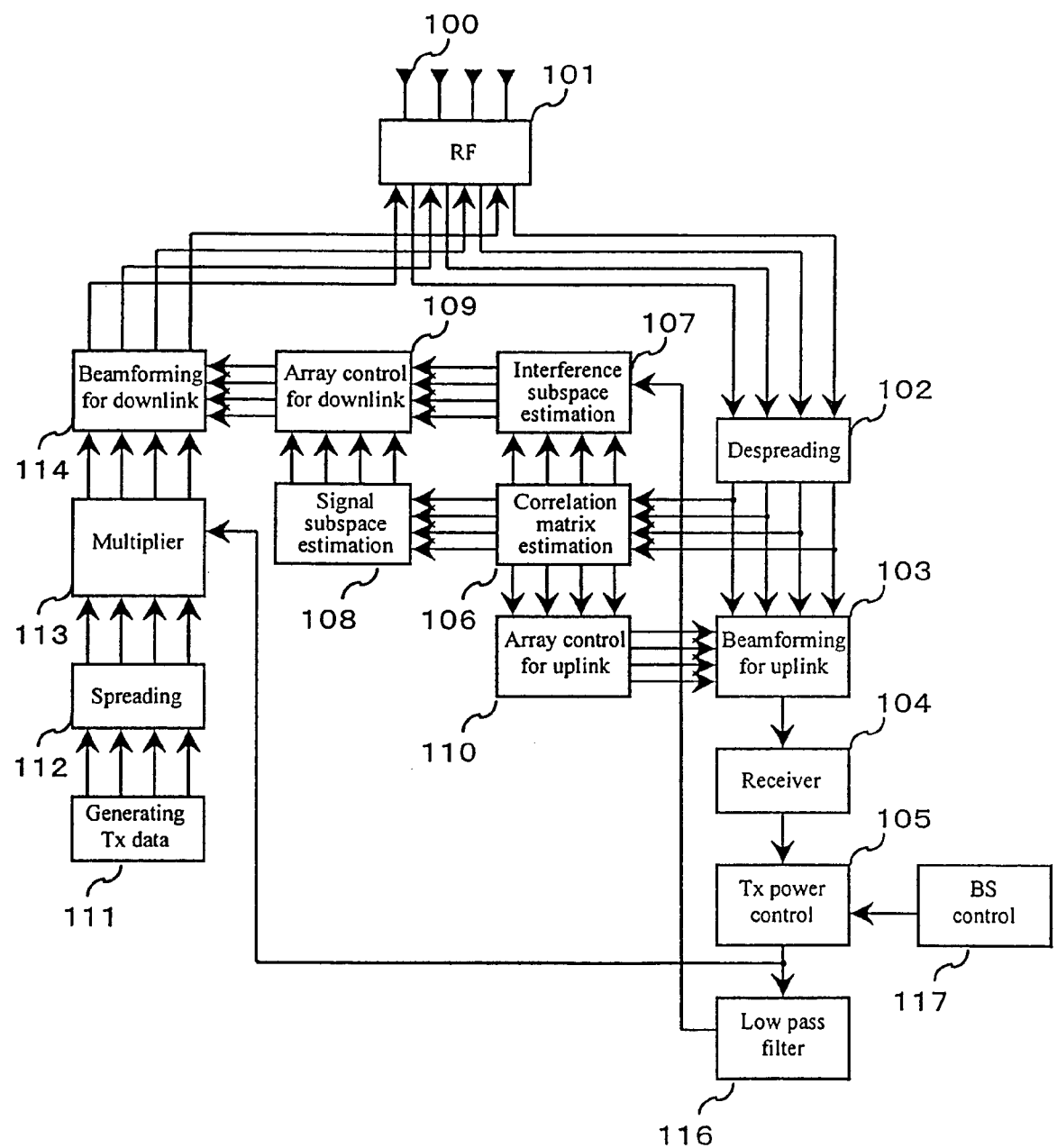
FIG. 4 is a block diagram of a preferred embodiment according to the present invention.

A radio communication system in a third embodiment according to the present invention will be described with reference to FIG. 4 and Expression (11). Expression (11) is an assistance for explaining a low-pass filter.

$$\lambda_i^{updated} = (1-\delta)\lambda_i^{old} + \delta\lambda_i^{new} \qquad \text{Expression 11}$$

There have been described methods of deciding the array weight for the downlink by using the subspace information about the incoming waves received through the uplink. In a practical system, transmission power is controlled by a fixed step and transmission power does not vary continuously. Transmission power is a very unstable value controlled in the range of variance due to misestimation of communication quality, communication errors in transmission control and information transfer, and delayed control due to delayed communication. If an interference subspace is built by directly using this value, the operation of the subspace is unstable. Therefore, a method that uses a low-pass filter for control instead of directly using a controlled variable as a coefficient is effective. Expression (11) represents a linear filter suitable for use as the low-pass filter. The instability of the interference subspace due to the variance of power control can be prevented by the low-pass filter.

In the radio communication base station provided with the array antenna, the transmission output of the downlink can be suppressed by array control of the downlink. Consequently, intercell interference and intracell interference can be reduced and the number of mobile stations (capacity) can be increased.

It is further understood by those skilled in the art that the foregoing description is a preferred embodiment of the disclosed device and that various changes and modifications may be made in the invention without departing from the spirit and scope thereof.

What is claimed is:

1. A transmission control method for a base station which communicates with a plurality of mobile stations via an array antenna, comprising the steps of:

receiving, using said array antenna, a plurality of uplink signals transmitted from said plurality of mobile stations;

providing a downlink array weight for transmitting downlink signals to one of said plurality of mobile stations such that said downlink array weight represents an antenna pattern having a maximum beam in a direction of said one of the plurality of mobile stations which transmitted a first uplink signal received using said array antenna, and having a null in a direction of a mobile station other than said one of the plurality of mobile stations which transmitted a second uplink signal received using said array antenna, wherein said downlink array weight is provided according to transmission power control information for a plurality of downlinks to said plurality of mobile stations.

2. The transmission control method according to claim 1, wherein said transmission power control information is used to select said mobile station other than said one of the plurality of mobile stations for which said antenna pattern has a null.

3. The transmission control method according to claim 1, wherein said transmission power control information is determined according to a transmission rate for a corresponding downlink.

4. The transmission control method according to claim 1, wherein the direction for the maximum beam is determined according to spatial information extracted from a plurality of symbols of the first uplink signal, and the direction for the null is determined according to spatial information extracted from a plurality of symbols of the second uplink signal.

* * * * *